United States Patent
Maurer (10) Patent No.: US 8,417,049 B2
(45) Date of Patent: Apr. 9, 2013

(54) FAST IMAGE RESOLUTION ENHANCEMENT WITH DE-PIXELING

(75) Inventor: Ron Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 12/578,757

(22) Filed: Oct. 14, 2009

(65) Prior Publication Data

US 2011/0085742 A1    Apr. 14, 2011

(51) Int. Cl.
*G06K 9/40* (2006.01)
*G06K 9/32* (2006.01)

(52) U.S. Cl.
USPC ............... 382/260; 382/299; 382/300

(58) Field of Classification Search ........... 382/260, 382/264, 272, 275, 276, 278, 299, 300; 358/453, 358/463; 702/189–195, 199
See application file for complete search history.

(56) References Cited

U.S. PATENT DOCUMENTS

| | | | |
|---|---|---|---|
| 5,594,508 A | 1/1997 | Penney | |
| 5,796,879 A | 8/1998 | Wong | |
| 5,889,895 A | 3/1999 | Wong | |
| 6,990,252 B2 * | 1/2006 | Shekter | 382/276 |
| 2006/0072801 A1 * | 4/2006 | Bernard Deman et al. | 382/131 |
| 2010/0310143 A1 * | 12/2010 | Rao et al. | 382/131 |

OTHER PUBLICATIONS

B. Triggs, "Empirical filter estimation for subpixel interpolation and matching", Int.Conf.Comp.Vision (ICCV'01), IEEE 2001, vol. 2, p. 550.
P. Thévenaz, T. Blu, M. Unser, "Interpolation revisited", IEEE Trans. Med.Imag., vol. 19, No. 7, pp. 739-758, Jul. 2000.
S E. Reichenbach and F. Geng, "Image reconstruction with two-dimensional piecewise polynomial convolution", Int.Conf. on Acoustic, Speech, and Signal Processing, IEEE, 1999, pp. 3237-3240.
W. Ping and C. Herley, "Area-based interpolation for scaling of images from a CCD", Int.Conf.Img.Proc (ICIP'97), IEEE, 1997, vol. 1 pp. 905-908.

* cited by examiner

*Primary Examiner* — Yon Couso (57) ABSTRACT

An output image that corresponds to a higher-resolution version of a source image is produced. In this process, source pixels of the source image are processed with a set of linear non-separable filter kernels to produce the output image with a corresponding output pixel block of constituent output pixels for each of the source pixels. The set of filter kernels has a mean substantially equal to an identity filter such that a downscaling of the of the output image to a resolution level of the source image produces a downscaled image that is substantially identical to the source image. For each of the source pixels, each of the filter kernels in the set is applied to a local neighborhood of the source pixel to produce a respective value of each of the constituent output pixels of the corresponding output pixel block.

22 Claims, 4 Drawing Sheets

FAST IMAGE RESOLUTION ENHANCEMENT WITH DE-PIXELING

BACKGROUND

The field of image resolution enhancement (also referred to as image interpolation, image upscaling, and image resampling) is very mature. In general, image resolution enhancement involves estimating unknown high-resolution information from low-resolution data based on both a model for the unknown high-resolution data, and a model for the image sampling process in both low-resolution and high-resolution image spaces. Some classical examples of data models are piecewise polynomial like in nearest-neighbor, bilinear, bicubic, and spline interpolation. The two principal models for image sampling are point sampling and area-sampling (i.e., integration over a "sensor" area around each sampling point). For each combination of a data model and sampling model, a large variety of solutions have been proposed for different combinations of the required resolution enhancement factor (e.g., integer/non-integer, small (×2)/large (>10)), the image type (e.g., single type of text, graphics, or photographs, or mixed type), and on the computational complexity (e.g., linear/non-linear, recursive/non-recursive, and single-pass/iterative).

In many situations, the default solution for image resolution enhancement uses pixel replication, which is fast and provides inherent sharpness; but pixel replication gives rise to pixeling artifacts (referred to as "jaggies"). Classical higher-order methods such as bi-linear (BL) or bi-cubic (BC) interpolation provide smoother reconstruction with much less pixeling, but at the price of detail-loss and therefore are sub-optimal in combining de-pixeling and sharpness preservation. Although sharpness could be boosted to a level similar to pixel replication by post-sharpening (e.g., unsharp masking), the sharpening operation increases computational complexity and boosts the mild pixeling of bilinear interpolation back to a medium level, although less than pixel replication.

What are needed are improved systems and methods of image resolution enhancement that provide de-pixeling and detail preservation with reduced computational complexity.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition Of Terms

The term "pixel" refers to an addressable region of an image. Each pixel has at least one respective value that is represented by one or more bits. For example, a pixel in the RGB color space includes a respective value for each of the colors red, green, and blue, where each of the values may be represented by one or more bits.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "linear filter" means a filter whose output is a linear function of the input. The term "filter kernel" refers to a matrix of entries that are applied to pixels of an image in order to implement a filtering function. The "form" of a filter kernel refers to the size and shape of the non-zero entries of the filer kernel. A "non-separable" filter is a filter that filters over more than one direction simultaneously, such that it cannot be decomposed into an equivalent sequence of uni-directional filters.

The term "processor" refers to an electronic circuit, usually on a single chip, which performs operations including but not limited to data processing operations, control operations, or both data processing operations and control operations.

The term "machine-readable medium" refers to any physical medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, and the term "including" means including but not limited to. The term "based on" means based at least in part on.

II. Overview

A. Introduction

The embodiments that are described herein provide resolution-enhancement methods that combine pixeling suppression (de-pixeling) and detail preservation at a very low computational cost. These embodiments are based on a novel design method for linear resolution-enhancement operations as a set of multiple linear two-dimensional (2D) filter kernels of predetermined form. The filer kernels are both non-separable and respect pixel-area considerations. In some embodiments, kernel parameters are trained by least-squares to maximize the detail-preservation while still achieving good de-pixeling. In some embodiments, a truncated-SVD optimization technique is employed to provide a parameterized optimization to control a trade-off between de-pixeling and detail preservation, so as to mildly sacrifice detail preservation for better de-pixeling. A single parameter set suits multiple image types (e.g., photographs, graphics, and text), such that the embodiments are suitable for images of mixed content. Overall, the embodiments that are disclosed herein provide a higher trade-off curve between speed and image quality relative to existing fast resolution enhancement alternatives such as bilinear/bicubic interpolation. These embodiments are particularly suitable for throughput constrained applications (e.g., printing pipelines, real-time video processing).

Figure 1:
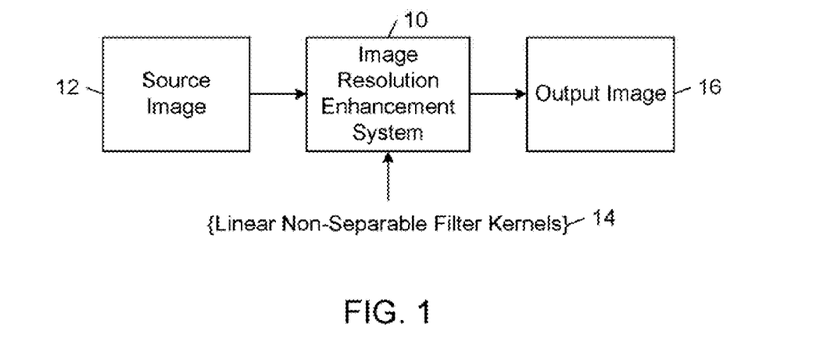
FIG. 1 is a block diagram of an embodiment of an image resolution enhancement system that produces an output image from an input image.

FIG. 1 shows an embodiment of an image resolution enhancement system 10 that receives a source image 12 and applies a set 14 of linear non-separable filter kernels to each of the source pixels of the source image in the process of producing an output image 16. The non-separability of the filter kernels enables the filter kernels to be designed to better suppress non-isotropic reconstruction errors, in particular pixeling artifacts. The set 14 of linear non-separable filter kernels has a mean substantially equal to an identity filter such that a downscaling of the of the output image 16 to a resolution level of the source image 12 produces a downscaled image that is substantially identical to the source image 12. This feature of the filter kernels enables the filter kernels to provide optimal sharpness by accounting for the pixel area reduction when upscaling (i.e., downscaling after upscaling substantially produces the original image).

The source image 12 may be a complete or a partial version of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The image resolution enhancement system 10 is not limited to any particular hardware or software configuration, but rather it may be implemented in any computing or processing environment, including in digital electronic circuitry or in computer hardware, firmware, device driver, or software. For example, in some implementations, image resolution enhancement system 10 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Figure 2:
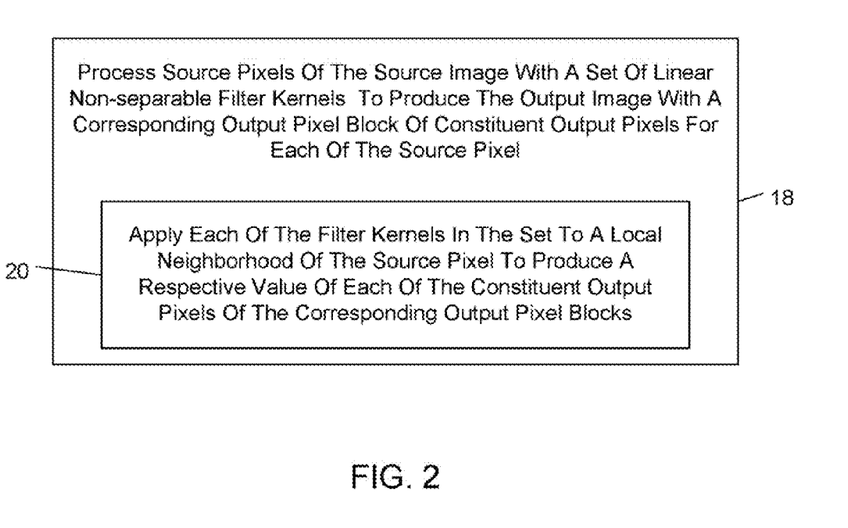
FIG. 2 is a flow diagram of an embodiment of a resolution enhancement method.

FIG. 2 shows an embodiment of a method that is implemented by the image resolution enhancement system 10 in the process of generating the output image 16 from the source image 12. In accordance with this method, the image resolution enhancement system 10 processes source pixels of the source image 12 with the set 14 of linear non-separable filter kernels to produce the output image 16 with a corresponding output pixel block of constituent output pixels for each of the source pixels (FIG. 2, block 18). In this process, for each of the source pixels, the image resolution enhancement system 10 applies each of the filter kernels in the set 14 to a local neighborhood of the source pixel to produce a respective value of each of the constituent output pixels of the corresponding output pixel block (FIG. 2, block 20).

The process of FIG. 2 is applied separately to each color channel in a selected color space (e.g., RGB, YCbCr, and CIELab). The illustrated embodiments are described for a single channel, with the understanding that the same process, perhaps with different settings, is applied to each channel of the selected color space.

B. Exemplary Embodiment for Resolution Doubling with Minimal Pixeling

The embodiments that are described in this section address the challenge of providing maximal pixeling-reduction (de-pixeling) with minimal sharpness-loss relative to pixel replication (PR) methods, at minimal computational complexity (linear scheme).

In general, the number of constituent pixels in each output pixel block is determined by the resolution enhancement factor. For illustrative purposes only, the resolution enhancement factor for the embodiments that are described below is two, and each output pixel block consists of four output pixels arranged in a 2×2 array. These embodiments are characterized by the most symmetric configuration of high-resolution output pixels relative to their low-resolution neighborhood (i.e., each of the pixels in the 2×2 block looks the same relative to the low-resolution pixel neighborhood flipped/rotated onto itself). This symmetry in turn reduces the number of independent parameters and simplifies the algorithm design, which facilitates higher speed (e.g. additions replace multiplications). In other embodiments, the resolution enhancement factor can be different from two, including both even and odd integer resolution enhancement factors. In some embodiments, if the required scaling factor is much larger than two, smart ×2, ×4 or ×8 upscaling followed by nearest neighbor interpolation is applied in order to reach the desired output image resolution. The smart upscaling step sufficiently reduces the visibility of residual pixeling, especially in printing application which involve halftoning and other noising mechanisms that mask the micro-roughening due to final nearest-neighbor interpolation.

Figure 3:
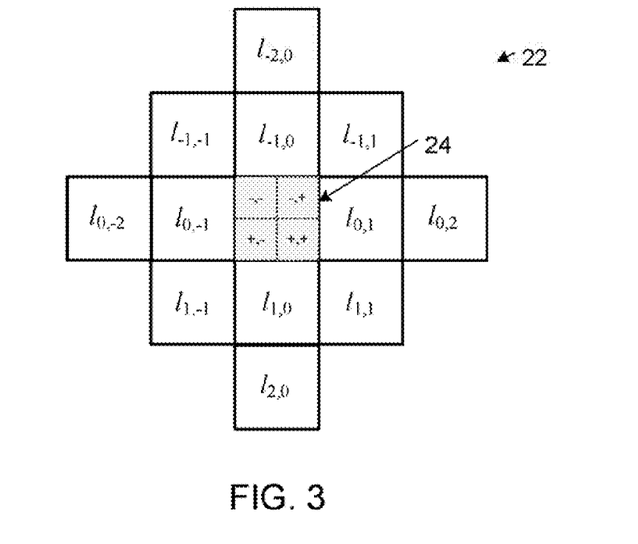
FIG. 3 is a block diagram of an embodiment of a local neighborhood of a particular source pixel in a source image, where a corresponding 2×2 output pixel block is overlaid onto the particular source pixel.

In the embodiments described herein, the source image 12 is modeled by an array of touching square pixel-cells, with the grid spacing equal to the side of the square. FIG. 3, for example, shows an exemplary embodiment of a local neighborhood 22 of a center source pixel ($I_{0,0}$) in a source image, where a corresponding 2×2 output pixel block 24 is overlaid onto the center source pixel. For each pixel of the source image, the image resolution enhancement system 10 computes four values {H(−,−), H(−,+), H(+,−), H(+,+)} for the output pixels (denoted by: −,−; −,+; +,−; and +,+) in the corresponding 2×2 output pixel block in the upscaled output image using four linear non-separable filter kernels operating on the local neighborhood of that pixel $L_{pq}$.

Figure 4A:
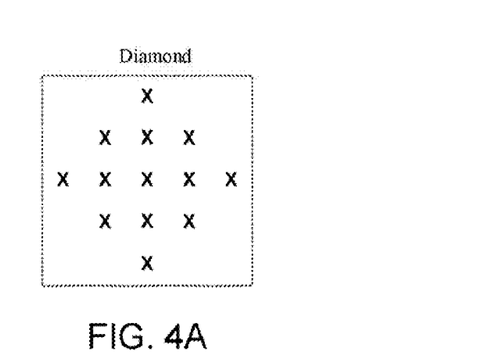
FIGS. 4A-4D respectively show different forms of local neighborhoods of a source pixel in a source image in an embodiment of the method of FIG. 2.

FIG. 4A shows a graphic representations of the diamond-shaped local neighborhood 22 (also referred to as a "context") shown in FIG. 3. Larger contexts may be used, but their increased computational cost provides only marginal quality improvement. Hence the focus from now on is on diamond-shaped context in FIG. 3, and symmetrical sub-neighborhoods of the diamond-shaped context: "Cross-1", "Cross-2", and "Sqr-1" that are respectively shown in FIGS. 4B-4C.

A diamond shaped context of FIG. 3 centered around a pixel L of the low-resolution source image, is expressed mathematically as: $L_{pq}^{nm} \equiv \{L_{n+p,m+q} | p+q \in [-2, \ldots 2]\}$ such that the indices p,q refer to the shifts relative to the neighborhood center (n,m). In particular, if the upper-left corner of the image is taken as the origin (0,0), then the low-resolution source pixel centers lie at half-integers $l_{n,m}=(n-½, m-½)$ in whereas the high-resolution output pixel centers lie at ±¼-pixel shifts from nearest low-resolution source pixel center $$h_{i,j} = \left(\frac{1}{2}i - \frac{1}{4}, \frac{1}{2}j - \frac{1}{4}\right).$$

In accordance with the resolution doubling process described in this section, the central low-resolution source pixel $L_{nm}$ is to be replaced by a 2×2 output pixel block of double-resolution pixels, $H_{rs}^{nm} \equiv [H_{2n-1,2m-1}, H_{2n-1,2m}; H_{2n,2m-1}, H_{2n,2m}]$ such that their side and grid spacing are half pixel. In FIG. 3, the coordinates are relative to the center of the central low-resolution source pixel, and the center coordinates of the high-resolution output pixels, positioned at ±¼, are denoted only by their signs.

Figure 4B:
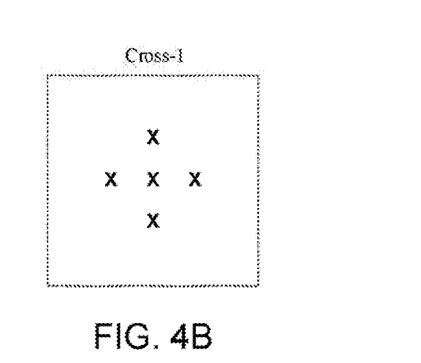
Figure 4C:
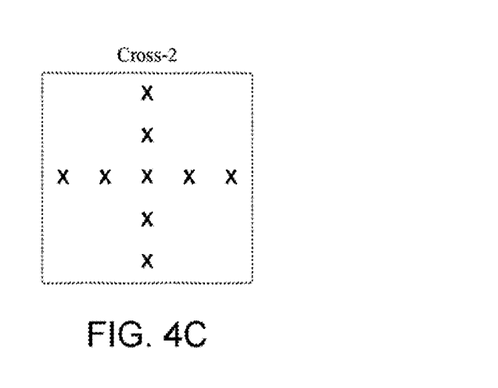
Figure 4D:
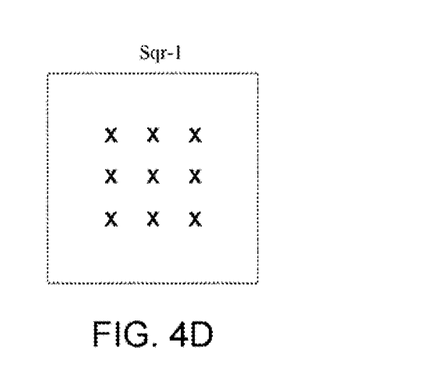
Figure 5A:
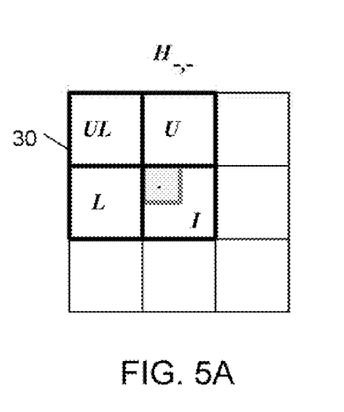
FIGS. 5A-5D respectively show different sets of nearest neighbor source image pixels for different respective ones of the output pixels in an output pixel block corresponding to a given source image pixel in a source image.
Figure 5B:
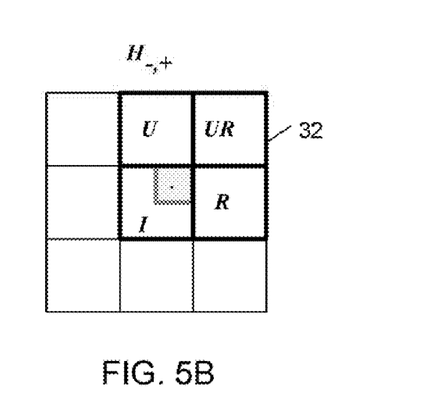
Figure 5C:
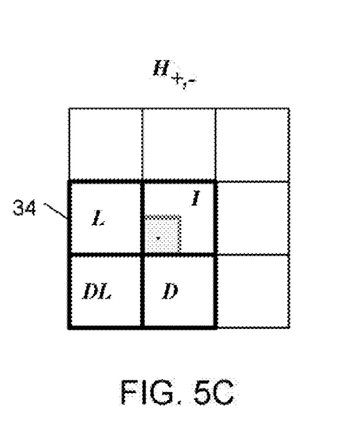
Figure 5D:
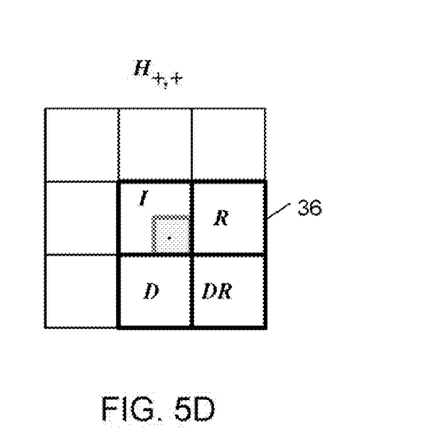

The respective value of each of the four high-resolution output pixels is calculated by a respective one of the linear convolution filters in the set 14 (denoted by $K_{rs}$) with a finite-support kernel, preferably small. In some embodiment the kernel-support is contained within the small diamond shaped context around the source pixel $L_{nm}$ as shown in FIG. 3. The multi-filter that computes the output pixel block $H_{nm}$ corresponding to the source pixel $L_{nm}$ is defined in equation (1), $$H_{rs}^{nm} = \sum_{p,q \in D} K_{rs}(p,q) \cdot L_{pq}^{nm} \quad (1)$$

$$\left(r, s \in \left[-\frac{1}{4}, +\frac{1}{4}\right] \equiv [-/+]\right)$$

where the summation is over neighboring pixel p,q contained in a context D. For example the context D may correspond to the diamond context of FIG. 3, or its sub-contexts of FIG. 4B-4C:

$D_{diamond}: |p+q| \leq 2; D_{cross2} |p+q| \leq 2 \cap pq = 0;$ $D_{cross1}: |p+q| \leq 1; D_{sqr1}: \max(|p|,|q|) \leq 1;$ (2)

In order to obtain increased-resolution image of good quality, the set of linear convolution kernels $K_{rs}$ is designed and optimized in advance with respect to some desired image reconstruction quality criteria. The basic kernel design process consists of three conceptual steps, regardless of the resolution enlargement factor:
1. Select the kernel context (form) D for the desired trade-off between computational speed and image quality.
2. Determine the parametric form (free parameters) of the set of kernels $K_{rs}$ jointly subject to the following constraints:
   a. Self-symmetry of each kernel under reflections that leave its target high-resolution pixel in place.
   b. Invariance of the kernel-set under square symmetry transformations T: $K_{T[r,s]}(T[p,q])=K_{r,s}(P,q)$.
   c. Each kernel entries sum up to 1 ("no gain in uniform regions" or "flat DC response")
   d. Area sampling condition: the high-resolution block-mean equals the low-resolution source pixel.
3. Optimize the free kernel-parameters by example-based training (e.g. by least-squares).

For the case of resolution doubling, the self-symmetry constraint is expressed in equation (3a). The upper left (rs=−,−) and lower-right (rs=+,+) high-resolution output pixels are symmetric under reflection about the main diagonal, while the other two high-resolution output pixels are symmetric under reflection about the secondary diagonal. Additionally, the invariance of the kernel set $K_{rs}$ under square symmetry transformations is expressed in equation (3b) using three independent reflections that form the basis of the square symmetry group:

$K_{\pm,\pm}(p,q)=K_{\pm,\pm}(-q,-p); K_{\pm,\mp}(p,q)=K_{\pm,\mp}(q,p);$ (3a)

$K_{-r,s}(p,q)=K_{r,s}(-p,q); K_{r,-s}(p,q)=K_{r,s}(p,-q); K_{s,r}(p,q)=K_{r,s}(q,p)$ (3b)

A combination of the symmetry consideration in equations (3a) and (3b) yields the set of parameterized diamond shaped multi-filters defined in equation (4) below.

$$K_{-,-} = \begin{bmatrix} & & c_1 & & \\ & d_1 & b_1 & d_3 & \\ c_1 & b_1 & a & b_2 & c_2 \\ & d_3 & b_2 & d_2 & \\ & & c_2 & & \end{bmatrix}; K_{-,+} = \begin{bmatrix} & & c_1 & & \\ & d_3 & b_1 & d_1 & \\ c_2 & b_2 & a & b_1 & c_1 \\ & d_2 & b_2 & d_3 & \\ & & c_2 & & \end{bmatrix} \quad (4)$$

$$K_{+,-} = \begin{bmatrix} & & c_2 & & \\ & d_3 & b_2 & d_2 & \\ c_1 & b_1 & a & b_2 & c_2 \\ & d_1 & b_1 & d_3 & \\ & & c_1 & & \end{bmatrix}; K_{+,+} = \begin{bmatrix} & & c_2 & & \\ & d_2 & b_2 & d_3 & \\ c_2 & b_2 & a & b_1 & c_1 \\ & d_3 & b_1 & d_1 & \\ & & c_1 & & \end{bmatrix}$$

In equation (4), the parameters corresponding to the low-resolution source pixels with the same distance from the center pixel have the same first letter, but with different numbering (a, $b_{1:2}$, $c_{1:2}$, $d_{1:3}$). Multi-filters with sub-contexts corresponding to FIG. 4B-4C correspond are obtained by pruning parts of the parameters: Cross-1 (a, $b_{1:2}$), Cross-2 (a, $b_{1:2}$, $c_{1:2}$), Sqr (a, $b_{1:2}$, $d_{1:3}$). In each of these embodiments, the free parameters additionally need to comply with the flat-DC constraint 2c (i.e., the weights sum to 1). This constraint effectively eliminates the center parameter a, by replacing it with (1−"sum of the other parameters"), e.g. for the Cross-1 context, a=1−2*($b_1+b_2$). If the area-sampling condition 2d, $$\text{mean}(K) = \frac{1}{4}\sum_{r,s=+/-} K_{r,s} = \begin{bmatrix} & & 0 & & \\ & 0 & 0 & 0 & \\ 0 & 0 & 1 & 0 & 0 \\ & 0 & 0 & 0 & \\ & & 0 & & \end{bmatrix}.$$

is additionally imposed, the following additional constraints are obtained:
$b_1+b_2=0$; $c_1+c_2=0$; $d_1+d_2+2d_3=0$, which also imply a=1. Hence if the area-sampling condition is imposed rigorously, the forms of the four multi-kernel in equation (4) are simplified with less free-parameters ($b \equiv b_1 = -b_2$; $c \equiv c_1 = -c_2$) as follows:

$$K_{-,-} = \begin{bmatrix} & & c & & \\ & d_1 & b & -\frac{1}{2}(d_1+d_2) & \\ c & b & 1 & -b & -c \\ & -\frac{1}{2}(d_1+d_2) & -b & d_2 & \\ & & -c & & \end{bmatrix}; \quad (5)$$

$$K_{-,+} = \begin{bmatrix} & & c & & \\ & -\frac{1}{2}(d_1+d_2) & b & d_1 & \\ c & -b & 1 & b & c \\ & d_2 & -b & -\frac{1}{2}(d_1+d_2) & \\ & & -c & & \end{bmatrix};$$

$$K_{+,-} = \begin{bmatrix} & & -c & & \\ & -\frac{1}{2}(d_1+d_2) & -b & d_2 & \\ c & b & 1 & -b & -c \\ & d_1 & b & -\frac{1}{2}(d_1+d_2) & \\ & & c & & \end{bmatrix};$$

$$K_{+,+} = \begin{bmatrix} & & -c & & \\ & d_2 & -b & -\frac{1}{2}(d_1+d_2) & \\ -c & -b & 1 & b & c \\ & -\frac{1}{2}(d_1+d_2) & b & d_1 & \\ & & c & & \end{bmatrix}$$

In some embodiments, the free kernel-parameters are optimized by example-based training that minimizes an image distortion criterion, e.g. sum of squared errors (SSE). The training images are represented as a set of non-overlapping 2×2 blocks $\tilde{H}_{rs}^{nm}$. Each such block is averaged to produce the corresponding pixel of the downscaled image $$L^{nm} = \frac{1}{4} \sum_{rs=\pm} \tilde{H}_{rs}^{nm}.$$

For a given selection of the multi-filter $K_{rs}$ the block error is the difference between the pixel values reconstructed with this multi-filter, $H_{rs}^{nm} = \Sigma_{p,q \in D} K_{rs}(p,q) \cdot L_{pq}^{nm}$ and the true pixel values $\tilde{H}_{rs}^{nm}$. The total block squared-error is the sum of squared errors of the individual block-pixels. And the total reconstruction squared-error is the sum of all block squared-errors $$\varepsilon_{SSE} = \sum_{nm} \sum_{rs=+/-} (H_{rs}^{nm} - \tilde{H}_{rs}^{nm})^2.$$

The SSE is first expressed in terms of the free parameters to facilitate their optimization such that the SSE is minimized (least-squares optimization). Denote the vector of free parameters by z (e.g. for the Diamond shape context $z=\{b, c, d_1, d_2\}$). Each of the multi-kernels $K_{rs}$ is expressed as a linear combination of the free parameters $z_j$ (augmented by the free-term $z_0=1$) and corresponding signed indicator kernels $I^{[j]}$, $$K_{rs}(p,q) \equiv \sum_j I_{rs}^{[j]}(p,q) \cdot z_j,$$

such that the entries in an indicator kernel $I^{[j]}$ are ±1 at locations that correspond to ±$z_j$ and zero elsewhere: if $K_{rs}(p,q)=\pm z_j$, $I_{rs}^{[j]}(p,q)=\pm 1$; else $I_{rs}^{[j]}(p,q)=0$; Hence the expression for reconstructed high-resolution pixels values is $$H_{rs}^{nm} = \sum_{j=0:J} A_{nm,rs}^{[j]} \cdot z_j \text{ where } A_{nm,rs}^{[j]} \equiv \sum_{pq} I_{rs}^{[j]}(p,q) \cdot L_{pq}^{nm} \quad (6)$$

Note that the term j=0 in equation (6) above yields always the value of the central pixel $L_{00}^{nm} = L_{nm}$. Now the SSE expression becomes $$\varepsilon_{SSE} = \sum_{nm} \sum_{rs} \left( \sum_{j=1:J} A_{nm,rs}^{[j]} \cdot z_j - \tilde{H}_{rs}^{nm} \right)^2,$$

where the term j=0 vanishes since the block average of both true and reconstructed high-resolution pixels is equal to the mother low-resolution pixel due to (the "flat-DC" constraint 2c). The SSE minimization with respect to the parameters $z_j$ corresponds to the classical least-squares problem when expressed in matrix form. The indices r, s, n, m (characterizing the position of each high-resolution pixel) are contracted into a single index v, so that $H_{rs}^{nm}$, is represented by a vector $\vec{h}=\{H_v\}$, and $A_{nm,rs}^{[j]}$ is represented by a matrix $\vec{A}=\{A_{v,j}\}$. This matrix is known in the art as the "design matrix". The solution of the least-squares problem is given in terms of the pseudo-inverse of the design matrix $A^+ \equiv (A^T A)^{-1} A^T$:

$$z_{opt} = \min_z \|\vec{A}z - \vec{h}\|^2 = \vec{A}^+ \vec{h} \quad (7)$$

The corresponding optimal sets of parameters obtained from training on either photo images, or on graphics/text images are very similar. Therefore it is possible to use a single set of parameters which is nearly optimal for all image types. This set of parameters is summarized in the Table 1 below. They are rounded to nearest fractions with a denominator $128=2^7$ to promote efficient integer arithmetic implementation without division operations:

TABLE 1

| Eq. 5 | Cross-1 | Sqr-1 | Cross-2 | Diamond |
|---|---|---|---|---|
| b | 20/128 | 20/128 | 26/128 | 25/128 |
| c | — | — | −6/128 | −6/128 |
| $d_1$ | — | 3/128 | — | 6/128 |
| $d_2$ | — | 5/128 | — | 2/128 |

The above-described kernel design method is characterized by the fact that the kernels are on one hand non-separable with a shape that is not necessarily square (which enables good pixeling suppression), and on the other hand account for the change in pixel area through the area-sampling condition, which automatically assure good sharpness preservation at the same level as pixel-replication. Once the set of four optimized kernels have been obtained, equation 1 is implemented in a straight forward fashion, such that for each original pixel, four convolution operations are performed, where the kernel entries are taken from equation (5) and Table 1. Such an implementation may be efficient on a hardware capable of performing several convolution operation in parallel, such as a GPU (Graphical Processing Unit). However for a serial or weakly-parallel hardware the computation can be sped-up by taking advantage of the high-symmetry of the kernel-set to re-use common partial computations, and to replace some multiplication operations by additions through extracting common factors.

In some embodiments, such a fast serial implementation is based on the representation of the output pixel expression in terms of the indicator kernels, like in equation (4). An example for the simplest kernel configuration "Cross-1" is detailed below. The output pixels according to equation (6) are:

$$H_{rs}^{nm} = A_{nm}^{[0]} + A_{nm,rs}^{[1]} \cdot b \text{ where } A_{nm}^{[0]} = L_{nm}; \quad (8)$$

$$A_{nm,rs}^{[1]} \equiv \sum_{pq} I_{rs}^{[1]}(p, q) \cdot L_{pq}^{nm}$$

In particular, the four indicator kernels are divided into two pairs such that the kernels in each pair are identical except for sign:

$$I_{-,-}^{[1]} = -I_{+,+}^{[1]} = \begin{bmatrix} 0 & 1 & 0 \\ 1 & 0 & -1 \\ 0 & -1 & 0 \end{bmatrix}; \quad (9)$$

$$I_{+,-}^{[1]} = -I_{-,+}^{[1]} = \begin{bmatrix} 0 & -1 & 0 \\ 1 & 0 & -1 \\ 0 & 1 & 0 \end{bmatrix},$$

hence only two of the four values $A_{nm,rs}^{[1]}$:(r,s∈+/−) need to be computed, and each of these computations involves only ADD/SUBTRACT operations. The explicit formulas for the four values of $H_{rs}^{nm}$ are:

$$H_{-,-}^{nm} = L_{nm} + b \cdot A_{-,-}^{[1]}(n,m); H_{+,+}^{nm} = L_{nm} + b \cdot A_{-,-}^{[1]}(n,m);$$

$$H_{+,-}^{nm} = L_{nm} + b \cdot A_{+,-}^{[1]}(n,m); H_{-,+}^{nm} = L_{nm} + b \cdot A_{+,-}^{[1]}(n,m);$$

where $$A_{-,-}^{[1]}(n,m) = L_{n,m-1} - L_{n,m+1} + L_{n-1,m} - L_{n+1,m};$$

$$A_{+,-}^{[1]}(n,m) = L_{n,m-1} - L_{n,m+1} + L_{n-1,m} + L_{n+1,m} \quad (10)$$

Note that the each of expressions $b \cdot A_{-,-}^{[1]}(n,m); b \cdot A_{+,-}^{[1]}(n,m)$ is computed only once but is used for two output pixels. Below is the pseudo-code for implementing equation (10) for computing the 2×2 output block in the "Cross-1" configuration:

```
// Identify pixels in the local neighborhood of a low resolution pixel
L(n,m):
//
//      L1
//   L2 L0 L3
//      L4
//
// implement multiplication by the fraction b = 20/128 = 5/32 using
integer multiplication
// and bit shifting
A1 = ( (L2–L3+ L1 –L4)*5 ) >> 5; // >>5 means shift 5 bit to the left,
i.e. divide by 32
H11 = L0+A1;      H22 = L0–A1;
A2 = ( (L2–L3–L1+L4)*5 ) >> 5;
H21 = L0+A2;      H12 = L0–A2;
// total integer operations count: 10 ADD/SUBTRACT + 2 MULTIPLY +
2 BIT_SHIFT
// Corresponding bilinear interpolation is slower: 8 ADD + 8
MULTIPLY + 4 BIT_SHIFT
```

As the pseudo-code demonstrates, the computational complexity of Eq. 10 is kept very low; even lower than the corresponding bilinear interpolation scheme that has only four taps per kernel, but has a less symmetric multi-kernel structure.

While for the "Cross-2" configuration, the design of the efficient implementation is similar, the "Square" and "Diamond" configurations are harder to design efficiently based on Eq. 6 due to the reduced symmetry of the kernels with respect to the parameters $d_1, d_2$. Nevertheless, the indicator kernels for all parameters b, c, $d_1$, $d_2$ have a zero-mean property (their entries sum to zero), which is also characteristic of local derivative or wavelet operators.

C. Exemplary Embodiment for Resolution Doubling with Controlled Trade-Off Between Sharpness and Artifacts 1. Overview In general, a hard constraint by the area-sampling constraint 2d leads to results that are perceptually as sharp as pixel replication, and much less jaggy, but still suffer from some residual artifacts (jaggedness, ringing). The underlying reason is that the area-sampling condition limits the form of the local Taylor model not to have symmetrical even orders, thus reducing its generalization power. This phenomenon is known as over-fitting. Due to this over-fitting, simply lifting constraint 2d (going back from equation (5) to equation (4)) and re-tuning the free parameters is insufficient, since the SSE error criterion used to tune the parameters previously attains its minimum at the point corresponding to constraint 2d. In some embodiments, over-fitting is avoided by including in the error-criterion terms corresponding to differences across block boundaries, at the cost of considerable complication of the solution. In other embodiments, the over-fitting phenomenon is addressed by expressing the error-criterion and the free parameters in a wavelet transform domain, which decouples the free parameters into non interacting groups, such that each parameter group affects only a certain part of the local Taylor expansion that corresponds to a well defined perceptual attribute (e.g., area-sampling condition, edge-sharpness/artifacts). With this decoupling, the parameter set directly controlling the area-sampling condition 2d can be tuned under a different smoothness constraint (truncated singular value decomposition, as explained in detail below), to obtain a "smooth" set of filter kernels, producing images with less pixeling and artifacts at a minimal loss of sharpness relative to the previous LS-based set of filter kernel which is termed "sharp" set. A final set of filter kernels can be made by mixing the "smooth" and "sharp" filters to set the desired deviation from the area-sampling condition that strikes the perceptually pleasing balance between sharpness loss and artifact suppression.

2. Wavelet-Domain Filter Design

In some embodiments, linear combinations of the upscaled output pixels that correspond to local average and local-derivatives within each block (2×2 wavelet transform) are calculated in order to further exploit the symmetry of the filter coefficients, and decouple the parameters as much as possible. The classical 2D-wavelet transform computes the DC, the first derivatives $\partial_x$, $\partial_y$ and the mixed second derivative $\partial^2_{xy}$. However, since the high-resolution output pixel centers are shifted in diagonal directions relative to the low-resolution source pixel center, derivatives at ±45° angles relative to the y-axis are computed in these embodiments ($\partial_+$, $\partial_-$). This corresponds to an orthogonal transformation (45° rotation) of the xy axis system, so that the rotated wavelet-transform remains orthonormal. In equation (11), the four wavelet coefficients A, are obtained from the high-resolution pixel values $H_{rs}$ by the four 2×2 transform matrices $W_{u,rs}$ where the index u=−1, 0, 1, 2 corresponds to their "angular frequency" property.

$$h_u^{nm} = \sum_{r,s=1}^{2} W_{u,rs} \cdot H_{rs}^{nm}; \quad (11)$$

$$dc: W_{0,rs} = \frac{1}{4} \cdot \begin{bmatrix} 1 & 1 \\ 1 & 1 \end{bmatrix};$$

$$\partial_+ : W_{1,rs} = \begin{bmatrix} 0 & 1 \\ -1 & 0 \end{bmatrix};$$

$$\partial_- : W_{-1,rs} = \begin{bmatrix} 1 & 0 \\ 0 & -1 \end{bmatrix};$$

$$\partial_{xy}^2 : W_{2,rs} = \frac{1}{2} \begin{bmatrix} 1 & -1 \\ -1 & 1 \end{bmatrix}$$

The inverse transform $W^1$ is given by the same set of four matrices up to scaling $$H_{rs}^{nm} = \sum_{u=-1}^{2} W_u^{-1} \cdot h_u^{nm}; \quad (12)$$

$$W_{rs,0}^{-1} = \begin{bmatrix} 1 & 1 \\ 1 & 1 \end{bmatrix};$$

$$W_{rs,1}^{-1} = \frac{1}{2}\begin{bmatrix} 0 & 1 \\ -1 & 0 \end{bmatrix};$$

$$W_{rs,-1}^{-1} = \frac{1}{2}\begin{bmatrix} 1 & 0 \\ 0 & -1 \end{bmatrix};$$

$$W_{rs,2}^{-1} = \frac{1}{2}\begin{bmatrix} 1 & -1 \\ -1 & 1 \end{bmatrix}$$

or in more explicit form:

(13)

| $H_{-,-} = h_0 + \frac{1}{2}(h_{-1} + h_2)$ | $H_{+,-} = h_0 + \frac{1}{2}(h_1 - h_2)$ |
|---|---|
| $H_{-,+} = h_0 - \frac{1}{2}(h_1 + h_2)$ | $H_{+,+} = h_0 + \frac{1}{2}(h_2 - h_{-1})$ |

The wavelet coefficients to be reconstructed $h_u^{nm}$, can be expressed via the low-resolution neighborhood pixels $L_{pq}^{nm}$ and the spatial multi-kernel coefficients $K_{rs}(pq)$:

$$h_u^{nm} = \sum_{r,s=1}^{2} W_{u,rs} \cdot \sum_{pq} K_{rs}(pq) \cdot L_{pq}^{nm} = \sum_{pq} k_u(pq) \cdot L_{pq}^{nm} \quad (14)$$

where $$k_u(pq) \equiv \sum_{rs} W_{u,rs} K_{rs}(pq) \quad (15)$$

are the wavelet transformed multi-kernels. Combining equations (4) and (11), gives the explicit form of the wavelet-domain kernels that does not enforce sampling area constraint 2d $$k_0(DC) = \begin{bmatrix} & & \alpha_2 & & \\ & \alpha_3 & \alpha_1 & \alpha_3 & \\ \alpha_2 & \alpha_1 & \alpha_0 \equiv a & \alpha_1 & \alpha_2 \\ & \alpha_3 & \alpha_1 & \alpha_3 & \\ & & \alpha_2 & & \end{bmatrix}; \quad (16)$$

$$k_1(\partial_+) = \begin{bmatrix} & & \beta_2 & & \\ & \beta_3 & \beta_1 & 0 & \\ \beta_2 & \beta_1 & 0 & -\beta_1 & -\beta_2 \\ & 0 & -\beta_1 & -\beta_3 & \\ & & -\beta_2 & & \end{bmatrix}$$

$$k_2(\partial_{xy}) = \begin{bmatrix} & & 0 & & \\ & \gamma & 0 & -\gamma & \\ 0 & 0 & 0 & 0 & 0 \\ & -\gamma & 0 & \gamma & \\ & & 0 & & \end{bmatrix};$$

$$k_{-1}(\partial_-) = \begin{bmatrix} & & -\beta_2 & & \\ & 0 & -\beta_1 & -\beta_3 & \\ \beta_2 & \beta_1 & 0 & -\beta_1 & -\beta_2 \\ & \beta_3 & \beta_1 & 0 & \\ & & \beta_2 & & \end{bmatrix}$$

where the wavelet-domain kernel parameters $\alpha_j$, $\beta_j$, $\gamma$ are related to the spatial-kernel parameters $a_j$, $b_j$, $c_j$ via the relations $$\begin{cases} \alpha_1 = \frac{1}{2}(b_1 + b_2) \\ \beta_1 = b_1 - b_2 \end{cases} \Leftrightarrow \begin{cases} b_1 = \alpha_1 + \frac{1}{2}\beta_1 \\ b_2 = \alpha_1 - \frac{1}{2}\beta_1 \end{cases} \quad (17)$$

$$\begin{cases} \alpha_2 = \frac{1}{2}(c_1 + c_2) \\ \beta_2 = c_1 - c_2 \end{cases} \Leftrightarrow \begin{cases} c_1 = \alpha_2 + \frac{1}{2}\beta_2 \\ c_2 = \alpha_2 - \frac{1}{2}\beta_2 \end{cases}$$

$$\begin{cases} \alpha_3 = \frac{1}{4}(d_1 + d_2 + 2d_3) \\ \beta_3 = d_1 - d_2 \\ \gamma = \frac{1}{2}(d_1 + d_2) - d_3 \end{cases} \Leftrightarrow \begin{cases} d_1 = \alpha_3 + \frac{1}{2}(\gamma + \beta_3) \\ d_2 = \alpha_3 + \frac{1}{2}(\gamma - \beta_3) \\ d_3 = \alpha_3 - \frac{1}{2}\gamma \end{cases}$$

In the wavelet-domain kernels (16), the coefficients are decoupled into three sets: the first ($\alpha_1$, $\alpha_2$, $\alpha_3$) corresponding to the DC coefficient; the second ($\beta_1$, $\beta_2$, $\beta_3$) to the two gradient components (±45° derivatives); and the third ($\gamma$) to the second mixed derivative. Each of the different parameter sets control different characteristics:

$k_0(DC)$ combined with the flat DC response constraint $$\alpha_0 + 4\sum_{j=1}^{3} \alpha_j = 1$$

contains a linear combination of the identity kernel (1 in the middle and zero elsewhere), and Laplacian operators at different scales weighted by the $\alpha_j$. In terms of Taylor expansion, it corresponds to angularly symmetrical even-orders, e.g. $\partial_{xx}+\partial_{yy}$. In terms of image processing it corresponds to a symmetric low-pass and/or high-boost filter, and therefore controls the sharpness feeling of large features where the contrast change takes place over a scale of two high-res pixels or more. Note that the area-sampling condition constraint (2d), corresponds to making all the $\alpha_{j\neq 0}$ zero, so $k_0(DC)$ becomes the identity kernel ($\alpha_0=1$). Therefore, imposing the area-sampling condition (2d) limits the approximation power of the local Taylor expansion, in particular it limits the ability to control trade-offs between artifact suppression and sharpness.

$k_{\pm 1}$ contain a linear combinations of first-order differences in the $\pm 45°$ directions weighted by the $\beta_j$. In terms of Taylor expansion, it corresponds to first and third orders, and can represent planar profiles (first order), or sharper edge profiles (third order). In terms of image processing it corresponds to a slope reconstruction filter, and therefore controls on one hand detail restoration (edge/lines/texture), and on other hand pixeling-artifacts (slope discontinuities at block boundaries), and overshoot artifacts.

$k_2$ contains the mixed derivative $\partial_{xy}$ weighte by $\gamma$. In terms of 2D-Taylor expansion, it represents an angle-dependent even order. In terms of image processing it has the least noticeable effect, except in certain classes of features such as thin diagonal lines, non-antialiased graphics, diagonal patterned texture, etc.

In some embodiments, the wavelet-domain kernel-parameters are optimized by least-squares training similarly to what was described above for the spatial kernel parameters. Due to the orthonormality of the wavelet transform used in equation (11), the sum of squared spatial reconstruction errors in each 2×2 block is equal to the sum of squared wavelet-coefficient errors in that block $$\varepsilon_{SSE} = \sum_{nm}\sum_{rs=+/-}\left(H_{rs}^{nm} - \tilde{H}_{rs}^{nm}\right)^2 = \sum_{nm}\sum_{u=-1}^{2}\left(h_u^{nm} - \tilde{h}_u^{nm}\right)^2 \quad (18)$$

where $\tilde{h}_u^{nm} = \sum_{r,s=1}^{2} W_{u,rs} \cdot \tilde{H}_{rs}^{nm}$

And $h_u^{nm}$ is given by equation (14). Denote the vector of the wavelet-domain parameters by $\zeta$ (e.g. for the Diamond shape context $\zeta = \{\alpha_{0:3}, \beta_{1:3}, \gamma\}$), and express the wavelet-domain kernels as a linear combination of the free-parameters and signed indicators kernels $$k_u(pq) \equiv \sum_j I_u^{[j]}(pq) \cdot \zeta_j \quad (19)$$

such that the entries in an indicator kernel $I^{[j]}$ are $\pm 1$ at locations that correspond to $\pm \zeta_j$ and zero elsewhere. The wavelet-domain decoupling of free-parameters is mathematically manifested by the fact that each of the parameter families $\alpha_j$, $\gamma$ is related to a small sub-set of derivative-order indicators u: $\{u=0 \leftrightarrow \alpha_j, u=\pm 1 \leftrightarrow \beta_j, u=2 \leftrightarrow \gamma\}$, such that, e.g., the indicator kernels $I_{u=0}^{[j]}$ vanish for all parameters except the $\alpha_j$ family. By inserting equation 19 into equation 14, the reconstructed wavelet coefficients are expressed as a direct linear combination of the wavelet-domain parameters:

$$h_u^{nm} = \sum_j A_{nm,u}^{[j]} \cdot \zeta_j \text{ where } A_{nm,u}^{[j]} \equiv \sum_{pq} I_u^{[j]}(p,q) \cdot L_{pq}^{nm}. \quad (20)$$

Equation (20) is inserted into the expression for the total sum-of-squared errors, and the decoupling of parameters explained above is used to break it into a sum of three terms, one for each parameter family:

$$\varepsilon_{SSE} = \sum_{nm}\sum_{u}\left(\sum_j A_{nm,u}^{[j]} \cdot \zeta_j - \tilde{h}_u^{nm}\right)^2 \quad (21)$$

$$\underbrace{\sum_j \sum_{nm} \left(A_{nm,0}^{[\alpha_j]} \cdot \alpha_j - \tilde{h}_0^{nm}\right)^2}_{\varepsilon_0} + \underbrace{\sum_j \sum_{nm} \sum_{u=\pm 1}\left(A_{nm,u}^{[\beta_j]} \cdot \beta_j - \tilde{h}_u^{nm}\right)^2}_{\varepsilon_1} +$$

$$\underbrace{\sum_{nm}\left(A_{nm,2}^{[\gamma]} \cdot \gamma - \tilde{h}_2^{nm}\right)^2}_{\varepsilon_2}$$

subject to the flat-DC constraint $$\alpha_0 + 4\sum_{j=1}^{3}\alpha_j = 1.$$

Since each of the terms is a sum of squares and hence non-negative, one can minimize each term independently. For each term, its "design matrix" A is formed, and the target vector h:

$$\vec{A}_0 = \{A_{v,j}^{[\alpha_j]}\}; h_0 = \{\tilde{h}_v\}; v \rightarrow (nm, u=0), j=0:3$$

$$\vec{A}_1 = \{A_{v,j}^{[\beta_j]}\}; h_1 = \{\tilde{h}_v\}; v \rightarrow (nm, u=\pm 1), j=1:3$$

$$\vec{A}_2 = \{A_{v,j}^{[\gamma]}\}; h_2 = \{\tilde{h}_v\}; v \rightarrow (nm, u=2), j=1 \quad (22)$$

Standard minimization of the error term $\epsilon_0$ with respect to the $\alpha$ parameter family is solved like in equation 7 by a pseudo inverse operation $$\alpha_0 = \min_z \left\|\vec{A}_0 \alpha - h_0\right\|^2 = \vec{A}_0^+ h_0; \text{ where} \quad (23)$$

$$\vec{A}_0^+ \equiv \left(\vec{A}_0^T \vec{A}_0\right)^T \vec{A}_0^T, \text{ and } h_0 = \{\tilde{h}_{u=0}^{nm}\} = \{L_{00}^{nm}\}$$

It is easy to verify that the DC-error term $\epsilon_0$ is minimized to absolute zero by taking $k_0(DC)$ in equation (16) to be the identity operator corresponding to the parameter vector $\alpha_0 = \{\alpha_0 = 1; \alpha_{j>0}=0\}$. This solution is exactly consistent with the area-based scaling condition, since by the definition of the downscaling operation, where each pixel corresponds to the DC-coefficient of the wavelet transform i.e. $L_{00} \equiv h_0$.

Minimizing with respect to the other parameters families $\beta, \gamma$ using standard standard least-squares/pseudo-inverse method produces the optimal parameters $\beta_{opt}, \gamma_{opt}$ summarized in Table 2.

TABLE 2

| Eq. 16 | Cross-1 | Sqr-1 | Cross-2 | Diamond |
|---|---|---|---|---|
| $\beta_1$ | 20/64 | 20/64 | 26/64 | 25/64 |
| $\beta_2$ | — | — | −6/64 | −6/64 |
| $\beta_3$ | — | −1/64 | — | 2/64 |
| $\gamma$ | — | 4/64 | — | 4/64 |

Note that these optimal parameters together with $a_0$ are exactly equivalent to the optimal parameter sets $b_{1:2}, c_{1:2}, d_{1:3}$ in Table 1 (via the inverse transform relations in equation 17). This parameter set is termed as the "sharp" setting, since it is consistent with the area-sampling condition and hence provides sharpness at least like pixel-replication.

In other embodiments, the DC kernel $k_0$ and its parameter set $\alpha$ is trained with SVD-truncation (see, e.g., J. W. Demmel, "Applied numerical linear algebra", SIAM press, Chapter 3, 1997) in order to overcome the over-fitting effect, escape the area sampling condition, and allow a controlled trade-off between sharpness and artifact suppression. First, the design matrix pseudo-inverse is expressed by singular value decomposition (SVD):

$$A_0^+ = (A_0^T A_0)^{-1} A_0^T \equiv \sum_{s=0:J} \sigma_s^{-1} w_s^T \cdot v_s \qquad (24)$$

where $\sigma_s \geq 0$ are singular values; $w_s, v_s$ are corresponding singular vectors. The $v_s$ are the principle axes of the error-ellipsoid ($\epsilon_0$=const), with the axis length inversely proportional to $\sigma_s$, hence smaller singular values carry higher uncertainty in the parameter set $\alpha$. Excluding the singular vector with the lowest singular value $v_0$, yields a minimal increase in $\epsilon_0$, while maximally reducing the uncertainty of the estimated parameter set:

$$\alpha_0 = A_0^+ \cdot L_{00} = \qquad (25)$$

$$\sum_{s=0:J} (\sigma_s^{-1} w_s^T \cdot L_{00}) v_s \xrightarrow{SVD-truncation} \alpha_1 = \alpha_0 - (\sigma_0^{-1} w_0^T \cdot L_{00}) v_0$$

$\alpha_1$ is termed the "smooth" setting and provides improved de-pixeling and artifact suppression at the cost of some sharpness-loss. Note that by the orthogonality of singular vectors between themselves $v_s$ the reconstruction error produced by the truncated component $v_0$ is uncorrelated with the reconstruction error of the un-truncated components $\alpha_1$ (the "smooth" setting).

The final kernel set is taken as a linear mixture between the "smooth" and "sharp" kernels, such that the degree of mixture is tuned either by some optimization criterion or by visual evaluation of the trade-off between sharpness and pixeling on a set of representative images. In some embodiments, the parameterized trade-off line between the "sharp" and "smooth" settings is given by equation (26), where t is denoted the mixture parameter:

$$\alpha(t) = \alpha_0 + t \cdot (\alpha_1 - \alpha_0) = \alpha_0 - t(\sigma_0^{-1} w_0^T \cdot L_{00}) v_0 \qquad (26)$$

The mixture parameter characterizes a trade-off between overshoot/jaggedness artifacts and sharpness loss. The setting t=0 is sharpest and provide for all configuration sharpness like pixel-replication, but at the cost of some residual artifacts which may be tolerated in some applications, but not in other. Higher settings $0<t\leq1$ yield less sharp results but also yield reduced artifacts.

In some embodiments, the mixture parameter t is tuned according to squared-error criteria (e.g. require a certain ratio between the DC error $\epsilon_0$ and the AC error $\epsilon_1+\epsilon_2$), or by filter-design criteria (e.g. require a certain weight for the central pixel). In other embodiments, the mixture parameter t is tuned manually based on visual evaluation. Table 3 summarizes the "smooth" parameters ($\alpha_1$) for the four configurations of FIGS. 4A-4D, and the selected mixture parameter t that provides the best visual results on a test suite containing photographs, graphics and text images.

TABLE 3

| ($\alpha_1$) | Cross-1 | Sqr-1 | Cross-2 | Diamond |
|---|---|---|---|---|
| $\alpha_0$ | 64/128 | 104/128 | 80/128 | 104/128 |
| $\alpha_1$ | 16/128 | 15/128 | 20/128 | 16/128 |
| $\alpha_2$ | — | — | −8/128 | −1/128 |
| $\alpha_3$ | — | −9/128 | — | −9/128 |
| t | 1/4 | 1 | 1/2 | 1 |

The value of the central weight $\alpha_0 = a$ is 14/16 or 13/16 in all recommended settings. Since the value a=1 is consistent with the area-sampling condition and generates a sharpness feeling like pixel-replication, it means that the reduced jaggedness is achieved at the cost of a minor loss of detail (relative to pixel-replication) of 2/16 to 3/16, i.e. less than 20%. As the context increases, the perceived sharpness loss is decreased. For comparison, bicubic interpolation has a≈3/4 (i.e. larger detail loss of ~25%. Hence all the above recommended DPIX settings yield sharper reconstruction than bicubic interpolation, and have similar or less residual jaggedness, and all that at a reduced computational cost (4×4 bicubic kernels for direct 2D convolution have more elements than even the 13-element diamond-shape kernel). While bicubic interpolation may be decomposed into separable x-y interpolations, a separable implementation is less parallel than 2D-interpolation, and hence less desirable for parallel hardware. In order to outperform the separable implementation of bicubic interpolation (for weakly-parallel or serial hardware), an alternative efficient implementation of DPIX based on wavelet decomposition is presented in the next section.

3. Fast Implementation for Serial Hardware by Wavelet Decomposition

The fast serial implementation is based on the wavelet-domain equations 11-14. It is designed to minimize the number of multiplications and bit-shift operations, and use mostly additions and subtractions. As an example, the implementation for the "Sqr-1" neighborhood is demonstrated since it involves all wavelet componenets and fits in a 3×3 window. In the first step of the implementation four wavelet coefficients are reconstructed for each low-resolution pixel (n,m), using equation (20)

$$\left(\text{i.e., } h_u = \sum_{p,q \in D} k_u(p, q) \cdot L(n + p, m + q)\{u = -1, 0, 1, 2\}\right),$$

with the kernel set below:

$$k_0(DC) = \begin{bmatrix} 0 & 0 & 0 \\ 0 & 1 & 0 \\ 0 & 0 & 0 \end{bmatrix} + \alpha_1(t) \cdot \begin{bmatrix} 0 & 1 & 0 \\ 1 & -4 & 1 \\ 0 & 1 & 0 \end{bmatrix} + \alpha_3(t) \cdot \begin{bmatrix} 1 & 0 & 1 \\ 0 & -4 & 0 \\ 1 & 0 & 1 \end{bmatrix}; \quad (27)$$

$$k_2(\partial_{xy}^2) = \tilde{\gamma} \cdot \begin{bmatrix} 1 & 0 & -1 \\ 0 & 0 & 0 \\ -1 & 0 & 1 \end{bmatrix};$$

$$k_1(\partial_+) = \tilde{\beta}_1 \cdot \begin{bmatrix} 0 & 1 & 0 \\ 1 & 0 & -1 \\ 0 & -1 & 0 \end{bmatrix} + \tilde{\beta}_3 \cdot \begin{bmatrix} 1 & 0 & 0 \\ 0 & 0 & 0 \\ 0 & 0 & -1 \end{bmatrix};$$

$$k_{-1}(\partial_-) = \tilde{\beta}_1 \cdot \begin{bmatrix} 0 & -1 & 0 \\ 1 & 0 & -1 \\ 0 & 1 & 0 \end{bmatrix} + \tilde{\beta}_3 \cdot \begin{bmatrix} 0 & 0 & -1 \\ 0 & 0 & 0 \\ 1 & 0 & 0 \end{bmatrix};$$

where $\tilde{\beta}_1 \equiv \frac{\beta_1}{2} = \frac{20}{128};$ $\tilde{\beta}_3 \equiv \frac{\beta_3}{2} = \frac{-1}{128};$ $\tilde{\gamma} \equiv \frac{\gamma}{4} = \frac{4}{128};$ $\alpha_1(t) = \frac{15t}{128};$ $\alpha_3(t) = \frac{-9t}{128}.$ All multiplicative factors are pre-computed and expressed as fractions with a common power-of-2 denominator to allow integer division by bit-shifts. In the second step of the implementation the four output high-resolution pixels are computed by the inverse wavelet transform corresponding to eq. 13, but where the factors of ½ where already accounted for in the first step:

| $H_{-,-} = h_0 + h_2 + h_1$ | $H_{+,-} = h_0 - h_2 + h_1$ |
|---|---|
| $H_{-,+} = h_0 - h_2 - h_1$ | $H_{+,+} = h_0 + h_2 - h_{-1}$ |

(28)

The formulas above can be implemented with only 6 ADD/SUBTRACT operations for the entire 2×2 block by caching intermediate results. Here is an exemplary pseudo-code to demonstrate the efficiency of this implementation (using the selected t=1)

```
// Identify pixels in the local neighborhood of a low resolution pixel
L(n,m):
//
//   L1 L2 L3
//   L8 L0 L4
//   L7 L6 L5
//
// all fractions have common denominator of 128 implemented as
7-bits shifting: >>7 )
// first compute the wavelet coefficients h0,h2,h1,h_1:
L15 = L1 +L5; L37=L3+L7; // cache reusable results for h0 and h2
h0 = (104*L0 + 15*(L2+L4+L6+L8) − 9*(L15+L37) ) >> 7;
h2 = (L15−L37) >> 5; // (4/128 = 1/32 : 5-bit shifts)
L2_6 = L2−L6; L8_4=L8−L4; // cache reusable results for h1 and
h_1
h1 = ( 20*(L8_4 + L2_6) + L5−L1 ) >> 7;
h_1 = ( 20*(L8_4 − L2_6) + L3−L7 ) >> 7;
// compute the final output pixels
h02 = h0+h2;         H11 = h02+h_1;      H22 = h02−h_1;
h02 = h0−h2;         H12 = h02+h1;       H21 = h02−h1;
// total integer operations count: 21 ADD/SUBTRACT + 5 MULTIPLY +
4 BIT_SHIFT
// Bilinear interpolation is only slightly faster: 8 ADD + 8 MULTIPLY +
4 BIT_SHIFT
```

The implementation for "Cross-1" with mixing parameter t=¼ is also demonstrated for comparison with bilinear interpolation reference and with the faster "Cross-1" implementation in the "sharp setting".

```
// Identify pixels in the local neighborhood of a low resolution pixel
L(n,m):
//
//       L1
//    L2 L0 L3
//       L4
//
h0 = (28*L0 + L1+L2+L3+L4) >> 5; // alpha_1 = 4/128 = 1/32=2⁻⁵
L2_3 = L2−L3; L1_4= L1−L4; // cache reusable results for h1 and h_1
// implement multiplication by the fraction beta_1 = 20/128 = 5/32 using
integer multiplication and bit shifting
h1 = (5*(L2_3 + L1_4)) >> 5;
h_1 = (5*(L2_3 − L1_4)) >> 5;
// compute the final output pixels
H11 = h0+h_1;                     H22 = h0−h_1;
H12 = h0+h1;                      H21 = h0−h1;
// total integer operations count: 12 ADD/SUBTRACT + 3 MULTIPLY +
3 BIT_SHIFT
// still faster than bilinear interpolation: 8 ADD + 8 MULTIPLY +
4 BIT_SHIFT, but
// ~30% slower than "sharp Cross-1": 10 ADD + 2 MULTIPLY +
2 BIT_SHIFT
```

Using the tuned parameters $\alpha(t)$, $\beta$, $\gamma$ from tables 2 and 3, and the wavelet based fast implementation described above, the combination of sharpness and de-pixeling for a given computational complexity has been observed to be considerably better than classical alternative interpolation filters: The 5-tap "Cross-1" output is nearly equivalent to bicubic interpolation but is faster even than the 4-tap bilinear interpolation; the 9-tap "Cross-2" is sharper than bicubic yet less pixeled and still considerably faster than bicubic; and the 13-tap "Diamond" result is on one hand considerably sharper than bi-cubic (almost as sharp as pixel replication), and less pixeled than even bi-linear interpolation, while on the other hand is still slightly faster than bi-cubic interpolation.

4. Direct Convolution Implementation for Parallel Hardware

This section describes a direct convolution based implementation of DPIX in the "smooth setting" which is most suitable for highly parallel hardware such as DSPs or GPUs that are designed for top performance on kernel convolution operations. This implementation performs 4 kernel convolutions as defined in equation (1), where the parametric form of the four kernels $K_{rs}$ is given in equation (4) (reproduced in equation (29) below):

$$K_{-,-} = \begin{bmatrix} & & c_1 & & \\ & d_1 & b_1 & d_3 & \\ c_1 & b_1 & a & b_2 & c_2 \\ & d_3 & b_2 & d_2 & \\ & & c_2 & & \end{bmatrix}; K_{-,+} = \begin{bmatrix} & & c_1 & & \\ & d_3 & b_1 & d_1 & \\ c_2 & b_2 & a & b_1 & c_1 \\ & d_2 & b_2 & d_3 & \\ & & c_2 & & \end{bmatrix} \quad (29)$$

$$K_{+,-} = \begin{bmatrix} & & c_2 & & \\ & d_3 & b_2 & d_2 & \\ c_1 & b_1 & a & b_2 & c_2 \\ & d_1 & b_1 & d_3 & \\ & & c_1 & & \end{bmatrix}; K_{+,+} = \begin{bmatrix} & & c_2 & & \\ & d_2 & b_2 & d_3 & \\ c_2 & b_2 & a & b_1 & c_1 \\ & d_3 & b_1 & d_1 & \\ & & c_1 & & \end{bmatrix}$$

The values of the kernel entries are obtained from the wavelet-reconstruction kernels $k_u$ by an inverse wavelet-transform that inverts the relation in equation (15):

$$K_{rs}(p, q)[t] \equiv \sum_u W_{r,s}^{-1}(u) \cdot k_u(p, q)[t], \quad (30)$$

where the entries of the DC reconstruction kernel $k_0$ depend on the mixing parameter t, and the inverse wavelet transform $W^{-1}$ is defined in equation (12). After putting everything together, Table 4 summarizes for all spatial configurations that were considered, the explicit formulas for all parameters a, $b_{1:2}$, $c_{1:2}$, $d_{1:3}$ as a function on the mixing parameter t, and provides the recommended value of mixing parameter $t_{rec}$. Setting t=0 yields the "sharp setting". All entries are given as fractions with a denominator of 128 for efficient integer arithmetic operations

TABLE 4

| Kernel Shape | Cross-1 | Sqr-1 | Cross-2 | Diamond |
| --- | --- | --- | --- | --- |
| $2^7 \times a(t)$ | 128 − 64t | 128 − 24t | 128 − 48t | 128 − 24t |
| $2^7 \times b_1(t)$ | 20 + 16t | 20 + 15t | 26 + 20t | 25 + 16t |
| $2^7 \times b_2(t)$ | −20 + 16t | −20 + 15t | −26 + 20t | −25 + 16t |
| $2^7 \times c_1(t)$ | — | — | −6 − 8t | −6 − t |
| $2^7 \times c_2(t)$ | — | — | 6 − 8t | 6 − t |
| $2^7 \times d_1(t)$ | — | 3 − 9t | — | 6 − 9t |
| $2^7 \times d_2(t)$ | — | 5 − 9t | — | 2 − 9t |
| $2^7 \times d_3(t)$ | — | −4 − 9t | — | −4 − 9t |
| $t_{rec}$ | 1/4 | 1 | 1/2 | 1 |
| $a(t_{rec})$ | 14/16 | 13/16 | 13/16 | 13/16 |

D. Exemplary Post-Processing Operations for Reducing Ringing Artifacts

Some embodiments of the image resolution enhancement system 10 are designed to handle ringing artifacts (overshoots) that appear at strong edges and whose visibility in final print increases as the input image resolution is lower (i.e., when the upscaled image is going to be further up-scaled to printer resolution). In these embodiments, the ringing problem is eliminated by clipping each output high-resolution output pixel value to be within the range of its four nearest low-resolution source pixel neighbors as shown in FIGS. 5A-5D. In particular, the four low-resolution source pixels within the boundary 30 (FIG. 5A) are the nearest low-resolution neighbors of the upper left high-resolution output pixel $H_{-,-}$; the four low-resolution source pixels within the boundary 32 (FIG. 5B) are the nearest low-resolution neighbors of the upper right high-resolution output pixel the four low-resolution source pixels within the boundary 34 (FIG. 5C) are the nearest low-resolution neighbors of the lower left high-resolution output pixel $H_{+,-}$; and the four low-resolution source pixels within the boundary 36 (FIG. 5D) are the nearest low-resolution neighbors of the lower right high-resolution output pixel $H_{+,+}$.

The low computational complexity of the overshoot clipping operation is demonstrated below: computing the minimum and maximum of a running 2×2 neighborhood takes two comparisons per low-res pixel (re-using sorting of common pixel-pairs), or 0.5 comparisons per high-res pixel. Each 2×2 low-resolution source pixel neighborhood includes four high-resolution output pixels at its center that can use the same minimum/maximum values for clipping, hence the number of comparisons needed for computing the clipping values are 0.125 per high-resolution output pixel. To this is added the two comparisons that are needed for the clipping operation to get a total overhead of 2.125 comparisons per high-resolution output pixel, or 8.5 operations for a 2×2 high-resolution output pixel block. As the DPIX algorithm requires between 14 operations to several tens of operations per block, the clipping is only a moderate overhead to the image resolution enhancement process. In particular the complexity of DPIX in the "sharp" setting with Cross-1 configuration combined with overshoot clipping is still not above that of bilinear interpolation.

III. Exemplary Operating Environments

A. Overview

Embodiments of the image resolution enhancement system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the image resolution enhancement system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image resolution enhancement system 10 may be implemented in any one of a wide variety of electronic devices, including desktop and workstation computers, digital still image cameras, digital video cameras, printers, scanners, and portable electronic devices (e.g., mobile phones, laptop and notebook computers, and personal digital assistants). Due to its efficient use of processing and memory resources, some embodiments of the image resolution enhancement system 10 may be implemented with relatively small and inexpensive components that have modest processing power and modest memory capacity. As a result, these embodiments are highly suitable for incorporation into throughput constrained systems, such as large-format printer imaging pipelines, which cannot afford high complexity resolution enhancement yet require better output quality than existing low-complexity alternatives such as pixel-replication or bilinear interpolation. These embodiments also are suitable for incorporation into compact device environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

B. A First Exemplary Image Processing System Architecture

Figure 6:
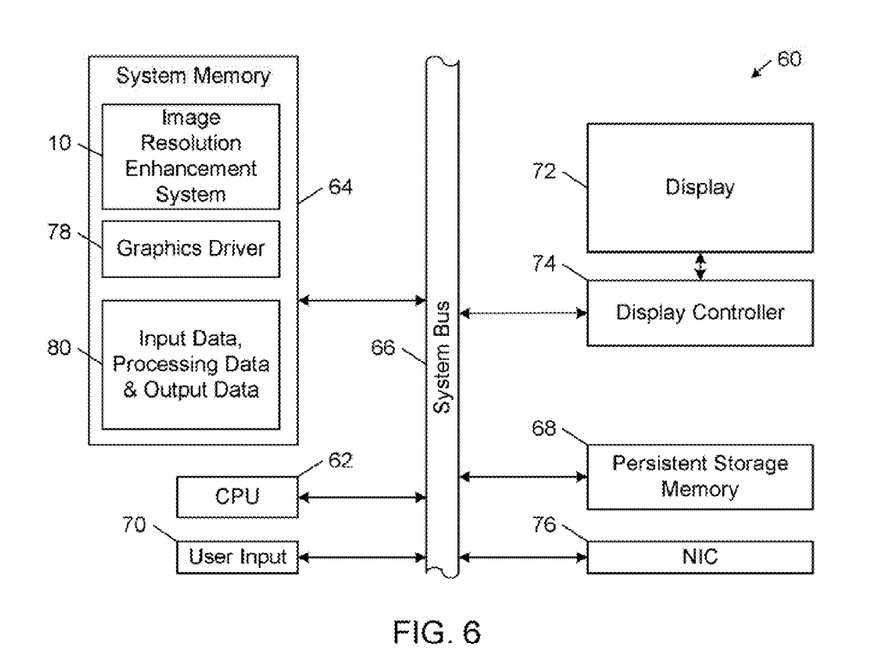
FIG. 6 is a block diagram of an embodiment of a computer system that incorporates the image resolution enhancement system of FIG. 1.

FIG. 6 shows an embodiment of a computer system 60 that incorporates any of the embodiments of the image processing system 10 described herein. The computer system 60 includes a processing unit 62 (CPU), a system memory 64, and a system bus 66 that couples processing unit 62 to the various components of the computer system 60. The processing unit 62 typically includes one or more processors, each of which may be in the form of any one of various commercially available processors. The system memory 64 typically includes a read only memory (ROM) that stores a basic input/output system (BIOS) that contains start-up routines for the computer system 60 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 70 (e.g., a keyboard, a computer mouse, a microphone, joystick, and touch pad). Information may be presented through a graphical user interface (GUI) that is displayed to the user on a display monitor 72, which is controlled by a display controller 74. The computer system 60 also typically includes peripheral output devices, such as speakers and a printer. One or more remote computers may be connected to the computer system 60 through a network interface card (NIC) 76.

As shown in FIG. 6, the system memory 64 also stores the image resolution enhancement system 10, a GUI driver 78, and a database 80 containing image files corresponding to the source image 12, the output image 16, other input data, intermediate processing data, and output data. In some embodiments, the image resolution enhancement system 10 interfaces with the GUI driver 78 and the user input 70 to control the creation of the output image 16. In some embodiments, the computer system 60 additionally includes a graphics application program that is configured to render image data on the display monitor 72 and to perform various image processing operations on the images 12, 16.

C. A Second Exemplary Image Processing System Architecture

Figure 7:
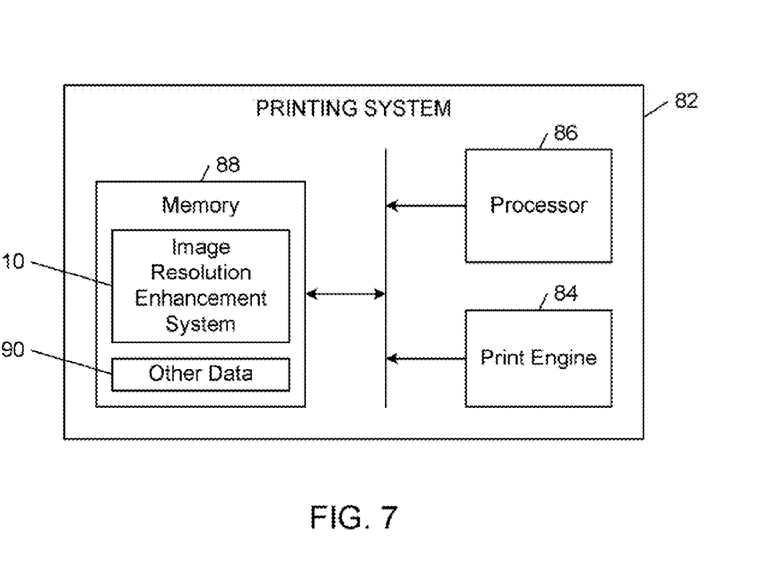
FIG. 7 is a block diagram of an embodiment of a printer system that incorporates the image resolution enhancement system of FIG. 1.

FIG. 7 shows an embodiment of a printing system 82 that includes a print engine 84, a processor 86 (e.g., an application specific integrated circuit (ASIC)), and a memory 88 that stores an embodiment of the image resolution enhancement system 10 and other data 90. The image resolution enhancement system 10 is implemented by machine-readable instructions that are accessible by the print engine 84 and the processor 86.

IV. Conclusion

The resolution enhancement embodiments that are described herein provide superior trade-offs for upscaling than comparable classical alternatives. The relative run-time estimates assume integer-arithmetic implementation on a CPU. The "sharp" setting is slightly faster than the "smooth" setting due to its higher symmetry. These embodiments are hardware friendly (ASIC, firmware, GPUs, . . . ) and are fast enough both in hardware and in software for real-time applications such as commercial printing pipelines, video upscaling, interactive screen-zoom, etc.

Other embodiments are within the scope of the claims.

The invention claimed is:

1. A method of producing an output image that corresponds to a higher-resolution version of a source image, comprising by a computer system:

processing source pixels of the source image with a set of linear non-separable filter kernels to produce the output image with a corresponding output pixel block of constituent output pixels for each of the source pixels;

wherein the set of filter kernels has a mean substantially equal to an identity filter such that a downscaling of the output image to a resolution level of the source image produces a downscaled image that is substantially identical to the source image; and wherein the processing comprises for each of the source pixels, applying each of the filter kernels in the set to a local neighborhood of the source pixel to produce a respective value of each of the constituent output pixels of the corresponding output pixel block.

2. The method of claim 1, wherein for each of the output pixel blocks H(n,m) of constituent output pixels $H_{r,s}(n,m)$, the applying comprises evaluating $$H_{r,s}(n, m) = \sum_{(p,q) \in D} K_{r,s}(p, q) \cdot L(n + p, m + q),$$

wherein (r,s) are indices of locations of the constituent output pixels in the output pixel block H(n,m), n and m are variables that index source pixel locations in the source image, L(n,m) is a value of a source pixel at location (n,m) in the source image, D is the respective local neighborhood of the source pixel L(n,m), and $K_{r,s}$ are the set of filter kernels.

3. The method of claim 2, wherein each of the kernels $K_{r,s}$ has self-symmetry according to reflections that leave its target high resolution pixel in place.

4. The method of claim 2, wherein the kernel-set $\{K_{r,s}(p,q)\}$ is invariant under square symmetry transformations T, such that $K_{T[r,s]}(T[p,q]) = K_{r,s}(p,q)$.

5. The method of claim 2, wherein the set of the filter kernels $K_s$ is based on a first component set of linear non-separable filter kernels each of which consists of a respective set of entries that sum to 1, and the first component set of filter kernels has a mean equal to an identity filter, such that the average of the output pixel block H(n,m) is equal to the value of the corresponding source pixel L(n,m).

6. The method of claim 1, wherein the filter kernels in the set are derived from filter kernel-set $K_{rs} = \{K_{-,-}, K_{-,+}, K_{+,-}, k_{+,+}\}$ corresponding to output pixel block size of 2×2, where the central part of the kernels have respective parameterized forms defined by:

$$K_{-,-} = \begin{bmatrix} & & c_1 & & \\ & d_1 & b_1 & d_3 & \\ c_1 & b_1 & a & b_2 & c_2 \\ & d_3 & b_2 & d_2 & \\ & & c_2 & & \end{bmatrix}; K_{-,+} = \begin{bmatrix} & & c_1 & & \\ & d_3 & b_1 & d_1 & \\ c_2 & b_2 & a & b_1 & c_1 \\ & d_2 & b_2 & d_3 & \\ & & c_2 & & \end{bmatrix}$$

$$K_{+,-} = \begin{bmatrix} & & c_2 & & \\ & d_3 & b_2 & d_2 & \\ c_1 & b_1 & a & b_2 & c_2 \\ & d_1 & b_1 & d_3 & \\ & & c_1 & & \end{bmatrix}; K_{+,+} = \begin{bmatrix} & & c_2 & & \\ & d_2 & b_2 & d_3 & \\ c_2 & b_2 & a & b_1 & c_1 \\ & d_3 & b_1 & d_1 & \\ & & c_1 & & \end{bmatrix}$$

wherein a, $b_{1:2}$, $c_{1:2}$, $d_{1:3}$ are parameters that have respective values.

7. The method of claim 6, wherein the applying comprises applying each of the filter kernels $K_{-,-}$, $K_{-,+}$, $K_{+,-}$, $K_{+,+}$ to the local neighborhood of the source pixel.

8. The method of claim 1, wherein for each of the output pixel blocks H(n,m) of constituent output pixels $H_{r,s}(n,m)$, the applying is decomposed into two steps, wherein the first step block wavelet coefficients $h_u(n,m)$ are reconstructed by $$h_u(n, m) = \sum_{(p,q)\in D} k_u(p, q) \cdot L(n + p, m + q),$$

wherein u is a wavelet coefficient index, n and m are variables that index source pixel locations in the source image, L(n,m) is a value of a source pixel at location (n,m) in the source image, D is the respective local neighborhood of the source pixel L(n,m), and $k_u$ are the set of wavelet-reconstruction filter kernels, and wherein the second step evaluates the constituent output pixels $H_{r,s}(n,m)$ from the reconstructed wavelet coefficients by:

$$H_{r,s}(n, m) = \sum_u W_{r,s}^{-1}(u) \cdot h_u(n, m)$$

wherein $W_{r,s}^{-1}(u)$ is a corresponding inverse wavelet transform, and (r,s) are indices of locations of the constituent output pixels in the output pixel block H(n,m).

9. The method of claim 8 wherein block wavelet coefficients for each of the output pixel blocks H(n,m) are computed by a 2×2 orthogonal wavelet transform by:

$$h_u(n, m) = \sum_{r,s} W_u(r, s) \cdot H_{r,s}(n, m)$$

wherein the wavelet components correspond to local-average ($W_0$), difference in one diagonal direction ($W_1$), difference in a second diagonal direction ($W_{-1}$), and mixed difference of second order ($W_2$):

$$W_0(r, s) = \frac{1}{4} \cdot \begin{bmatrix} 1 & 1 \\ 1 & 1 \end{bmatrix};$$

$$W_1(r, s) = \begin{bmatrix} 0 & 1 \\ -1 & 0 \end{bmatrix};$$

$$W_{-1}(r, s) = \begin{bmatrix} 1 & 0 \\ 0 & -1 \end{bmatrix};$$

$$W_2(r, s) = \frac{1}{2} \begin{bmatrix} 1 & -1 \\ -1 & 1 \end{bmatrix},$$

wherein the inverse wavelet transform is given by the same matrices up to scaling:

$W_0^{-1} = 4 \cdot W_0$; $W_1^{-1} = W_1/2$; $W_{-1}^{-1} = W_{-1}/2$; $W_2^{-1} = W_2$, wherein the wavelet reconstruction filter kernels have respective parameterized forms in the wavelet domain defined by:

$$k_0(DC) = \begin{bmatrix} & & \alpha_2 & & \\ & \alpha_3 & \alpha_1 & \alpha_3 & \\ \alpha_2 & \alpha_1 & \alpha_0 \equiv a & \alpha_1 & \alpha_2 \\ & \alpha_3 & \alpha_1 & \alpha_3 & \\ & & \alpha_2 & & \end{bmatrix};$$

$$k_1(\partial_+) = \begin{bmatrix} & & \beta_2 & & \\ & \beta_3 & \beta_1 & 0 & \\ \beta_2 & \beta_1 & 0 & -\beta_1 & -\beta_2 \\ & 0 & -\beta_1 & -\beta_3 & \\ & & -\beta_2 & & \end{bmatrix}$$

$$k_2(\partial_{xy}) = \begin{bmatrix} & & 0 & & \\ & \gamma & 0 & -\gamma & \\ 0 & 0 & 0 & 0 & 0 \\ & -\gamma & 0 & \gamma & \\ & & 0 & & \end{bmatrix};$$

$$k_{-1}(\partial_-) = \begin{bmatrix} & & -\beta_2 & & \\ & 0 & -\beta_1 & -\beta_3 & \\ \beta_2 & \beta_1 & 0 & -\beta_1 & -\beta_2 \\ & \beta_3 & \beta_1 & 0 & \\ & & \beta_2 & & \end{bmatrix}$$

wherein $\alpha_{0:3}$, $\beta_{1:3}$, $\gamma$ are parameters that are related to the parameters a, $b_{1:2}$, $C_{1:2}$, $d_{1:3}$ of the filter kernel-set $K_{rs}$ of claim 6 by the wavelet transform $$k_u(p, q) \equiv \sum_{r,s} W_u(r, s) K_{rs}(p, q).$$

10. The method of claim 9, wherein the parameters sets $\alpha_{0:3}$, $\beta_{1:3}$, and $\gamma$ are tuned independently by minimization of a sum-of-squared-errors metric to produce a first component set of wavelet reconstruction filter kernels, wherein the DC component reconstruction filter $k_0$ is equal to an identity filter, such that the average of the output pixel block H(n,m) is equal to the value of the corresponding source pixel L(n,m).

11. The method of claim 9, wherein the parameters set $\alpha_{0:3}$ is tuned by a constrained minimization of a sum-of-squared-errors metric to produce a second DC component reconstruction filter $k_0$ that is not equal to an identity filter, wherein the actual DC component reconstruction filter $k_0$ comprises a mixture of the identity filter and the second DC component reconstruction filter, and the respective contributions of the identity filter and the second DC component reconstruction filter is controlled by a mixture parameter value.

12. The method of claim 6 and claim 11, wherein the set of direct filter kernels $K_{r,s}$ is computed by an inverse wavelet transform $$K_{rs}(p, q) \equiv \sum_u W_{r,s}^{-1}(u) \cdot k_u(p, q)$$

from the wavelet reconstruction filter kernels that are tuned by a mixture parameter value.

13. The method of claim 1, wherein each of the local neighborhoods is identical in form, and further comprising selecting the form of the local neighborhoods from a set of predetermined forms.

14. The method of claim 13, further comprising ascertaining the set of filter kernels based on the selected form of the local neighborhoods.

15. The method of claim 14, wherein the ascertaining comprises:
ascertaining a different respective one of the filter kernels $K_{r,s}$ for each of the constituent output pixel locations s in the output pixel blocks H(n,m) that satisfies $$H_{r,s}(n, m) = \sum_{(p,q) \in D} K_{r,s}(p, q) \cdot L(n + p, m + q),$$

wherein (r,s) are indices of locations of the constituent output pixels in the output pixel block H(n,m), n and m are variables that index source pixel locations in the source image, L(n,m) is a value of a source pixel at location (n,m) in the source image, and D is the respective local neighborhood of the source pixel L(n,m).

16. The method of claim 15, wherein:
the set of the filter kernels $K_s$ comprises a mixture of a first component set of filter kernels and a second component set of filter kernels; and
the ascertaining further comprises
determining a the first component set of filter kernels each of which is reflection symmetric and consists of a set of entries that sum to 1, wherein the first component set of filter kernels is square symmetric and has a mean equal to an identity filter, and
computing a second component set of filter kernels each of which is reflection symmetric and consists of a set of entries that sum to 1, wherein the first component set of filter kernels is square symmetric, and the computing comprises determining a parametric form of the second component set of filter kernels and optimizing parameters of the parameter form of the second component set of filter kernels based on training samples.

17. The method of claim 15, wherein the filter kernel set $K_{r,s}$ is designed so as to minimize the image reconstruction error in a selected training set.

18. The method of claim 17, wherein the computing comprises computing the second component set of kernel filters subject to a condition that image reconstruction error produced by the second component set of filter kernels is minimal under the constraint of being statistically uncorrelated with image reconstruction error produced by the difference between first and second component sets of filter kernels.

19. The method of claim 1, wherein for each of the output pixel blocks the determining comprises suppressing ringing artifacts in the output image by clipping the respective value of the respective constituent output pixel to a range of values bounded by maximal and minimal values of the source pixels at locations in the source image nearest the corresponding location of respective constituent output pixel in the output image.

20. The method of claim 1, wherein the processing comprises for each of the source pixels:
computing a set of intermediate wavelet transform coefficients by convolving each of the filter kernels in the set with the local neighborhood of the source pixel; and
producing the respective value of each of the constituent output pixels of the corresponding output pixel block from a respective combination of ones of the intermediate wavelet transform coefficients.

21. Apparatus, comprising:
a computer-readable medium storing computer-readable instructions; and
a data processor coupled to the computer-readable medium, operable to execute the instructions, and based at least in part on the execution of the instructions operable to perform operations comprising
processing source pixels of the source image with a set of linear non-separable filter kernels to produce the output image with a corresponding output pixel block of constituent output pixels for each of the source pixels;
wherein the set of filter kernels has a mean substantially equal to an identity filter such that a downscaling of the output image to a resolution level of the source image produces a downscaled image that is substantially identical to the source image; and
wherein the processing comprises for each of the source pixels, applying each of the filter kernels in the set to a local neighborhood of the source pixel to produce a respective value of each of the constituent output pixels of the corresponding output pixel block.

22. At least one computer-readable medium having computer-readable program code embodied therein, the computer-readable program code adapted to be executed by a computer to implement a method comprising:
processing source pixels of the source image with a set of linear non-separable filter kernels to produce the output image with a corresponding output pixel block of constituent output pixels for each of the source pixels;
wherein the set of filter kernels has a mean substantially equal to an identity filter such that a downscaling of the output image to a resolution level of the source image produces a downscaled image that is substantially identical to the source image; and
wherein the processing comprises for each of the source pixels, applying each of the filter kernels in the set to a local neighborhood of the source pixel to produce a respective value of each of the constituent output pixels of the corresponding output pixel block.

* * * * *

UNITED STATES PATENT AND TRADEMARK OFFICE
CERTIFICATE OF CORRECTION

PATENT NO. : 8,417,049 B2  Page 1 of 1
APPLICATION NO. : 12/578757
DATED : April 9, 2013
INVENTOR(S) : Ron Maurer It is certified that error appears in the above-identified patent and that said Letters Patent is hereby corrected as shown below:

In the Claims:

In column 23, line 19, in Claim 7, delete "$K_{+,+}$to" and insert -- $K_{+,+}$ to --, therefor.

In column 24, line 47, in Claim 9, delete "$C_{1:2}$," and insert -- $c_{1:2}$, --, therefor.

In column 24, line 56, in Claim 10, delete "$\gamma$are" and insert -- $\gamma$ are --, therefor.

In column 25, line 44, in Claim 16, after "determining" delete "a".

Signed and Sealed this
Thirteenth Day of August, 2013

Teresa Stanek Rea
*Acting Director of the United States Patent and Trademark Office*